United States Patent [19]

Badenhop et al.

[11] Patent Number: 4,567,009

[45] Date of Patent: Jan. 28, 1986

[54] PRODUCTION OF MICROFILTRATION MEMBRANE FILTER

[75] Inventors: Charles T. Badenhop; Joachim Fischer, both of Bad Kreuznach, Fed. Rep. of Germany

[73] Assignee: Seitz Filter Werke Theo & Geo Seitz GmbH & Co., Bad Kreuznach, Fed. Rep. of Germany

[21] Appl. No.: 499,379

[22] Filed: May 31, 1983

[30] Foreign Application Priority Data

May 29, 1982 [DE] Fed. Rep. of Germany ....... 3220376

[51] Int. Cl.$^4$ ............................................ B29C 67/20
[52] U.S. Cl. .................................... 264/41; 210/500.2; 264/DIG. 62
[58] Field of Search ............... 210/500.2; 264/41, 344, 264/DIG. 48, DIG. 62; 528/348

[56] References Cited

U.S. PATENT DOCUMENTS

| Re. 30,352 | 7/1980 | Kwolek . | |
|---|---|---|---|
| 3,408,315 | 10/1968 | Paine | 260/2.5 |
| 3,567,632 | 3/1971 | Richter et al. | 210/500.2 |
| 3,969,452 | 7/1976 | Ciliberti et al. | 264/41 |
| 4,229,291 | 10/1980 | Walch et al. | 210/23 |
| 4,269,967 | 5/1981 | Elfert et al. | 210/500.2 |
| 4,482,514 | 11/1984 | Schindler | 264/41 |

FOREIGN PATENT DOCUMENTS

| 0036315 | 9/1981 | European Pat. Off. . | |
|---|---|---|---|
| EP45435 | 2/1982 | European Pat. Off. | 210/500.2 |
| 51-37878 | 3/1976 | Japan | 210/500.2 |

Primary Examiner—James Lowe
Attorney, Agent, or Firm—Karl F. Ross; Herbert Dubno

[57] ABSTRACT

A microfiltration membrane is made up dissolving m-phenylenediamine-isophthalic acid copolymer, a high temperature aromatic polyamide, in one or more solvents selected from the group which consists of N-methylpyrrolidone, dimethylformamide and dimethylacetamide, and the resulting solution in the presence of two or more of these solvents, a structure-loosening agent such as water or a polyhydric alcohol, is cast. After gel formation in the film, the latter is washed free from solvents and dried. The microfiltration membrane has high bursting strength and a pore point of 0.05 to 10 microns and a high permeability.

8 Claims, 2 Drawing Figures

PRODUCTION OF MICROFILTRATION MEMBRANE FILTER

FIELD OF THE INVENTION

Our present invention relates to a membrane filter for microfiltration and, more particularly, to a microfiltration membrane which is composed in whole or in part of synthetic resin material. The invention also relates to a method of making such an membrane filter.

BACKGROUND OF THE INVENTION

A microfiltration filter generally has a membrane with a pore size or diameter between about 0.05 microns and about 10 microns ($\mu$m) and which may be composed of synthetic resin materials.

Microfiltration membranes have been proposed in a variety of forms and can be constituted, according to the art, from various compositions. For example, mention may be made of cellulose esters, polysulfones, (European patent application No. 81 - 301 074/003 63 15) polyvinylchloride, (PVC), aliphatic polyamides (U.S. Pat. No. 3,408,315) or the like.

While these materials have been found to be effective for many microfiltration processes and in membrane filters for use on a small scale and have limited applications, they generally have characteristics which have limited their wide-spread industrial use. For example, they may have limited chemical resistance, i.e. resistance to attach by corrosive substances, they may have poor resistance to moisture, and may have poor mechanical properties such as tearing strength and bending strength.

Strength problems in filters have been attacked by providing membranes which are composed of aromatic polyamides (German patent document No. DE-OS 26 42 979 and U.S. Pat. No. 4,229,291), although these membrane filters do not have a pore size in the range of about 0.05 microns to about 10 microns and are not suitable for use in microfiltration. Indeed, as far as we are aware, it has not been possible heretofore to provide such membrane filters suitable for microfiltration.

OBJECTS OF THE INVENTION

It is, therefore, an object of the present invention to provide an improved membrane suitable for microfiltration which avoids disadvantages of other membranes used for microfiltration and yet has mechanical advantages similar to those which could not heretofore have been used effectively for microfiltration.

A more specific object of the invention is to provide an improved membrane filter for microfiltration, i.e. having a pore size of between 0.05 microns and 10 microns, with excellent chemical resistance, moisture resistance and mechanical properties such as bending strength and tearing strength.

Yet another object of this invention is to provide an improved method of making membrane filters suitable for microfiltration.

SUMMARY OF THE INVENTION

These objects and others which will become apparent hereinafter are attained, in accordance with the present invention which is based upon our surprising discovery that the aforementioned requirements for a microfiltration membrane can be obtained when the membrane filter is composed of an aromatic polyamide with a pore size in the range of about 0.05 microns to about 10 microns. Such a filter has excellent resistance to many chemicals considered corrosive to microfiltration membranes heretofore and has an exceptional resistance to attack by most hydrocarbons and many other organic solvents. The microfiltration membrane is also resistant to attack by common acids and alkalies during filtration under normal conditions, e.g. room temperature. A further advantage of the membrane is its resistance to moisture which far exceeds that of microfiltration membrane filters hitherto known and used.

We have found that best results can be obtained by forming the filter membrane from high-temperature-resistant practically nonmeltable aromatic polyamides having a pore size between about 0.1 microns and about 10 microns and especially when the microfiltration membrane is composed of a copolymer of m-phenylenediamine and isophthalic acid. The thickness of the microfilter membrane of the invention should be beween 0.05 mm and 0.15 mm.

The present invention also involves a new method of making microfiltration membranes which in itself represents an advance over the art. In earlier methods of forming a membrane, a solution or a dispersion of the synthetic resin intended to form the microfiltration membrane was deposited on a smooth comparatively dense and chemically inert surface in a predetermined layer thickness under carefully selected environmental conditions, especially atmospheric moisture content or relative humidity. The solvent was then driven off from this layer and, when the gelling material had sufficient strength, it was stripped from the surface.

According to the invention, a high-temperature-resistant practically nonmeltable aromatic polyamide is used as the starting material and is dissolved in a solution of dimethylacetamide, dimethylformamide and/or N-methylpyrrolidone.

Upon formation of a solution of the aromatic polyamide in at least two of these three solvents, with no one solvent making up more than 80% of the mixture, one or more structure-loosening additives are supplied to the solvent mixture as well as any additional solvent required to dilute the mixture to the desired viscosity. The solvent mixture is then stirred and agitated intensively for homogenization.

The homogeneous mixture is then spread in the desired thickness of the finished microfiltration membrane under climatically controlled conditions with a relative humidity between 50 and 90% and selected to insure the formation of the desired pore size of the membrane and, after gelling the solvent is removed from the layer by repeated washings in water.

This unique approach to fabricating a microfiltration membrane gives rise to a number of significant advantages.

Firstly, it allows the use of aromatic polyamides which are practically nonmeltable and are scarcely soluble in most solvents. It is indeed surprising to find that such aromatic polyamides can be solubilized to the extent necessary for the purposes of the invention in the three solvents, namely, dimethylacetamide and dimethylformamide and N-methylpyrrolidone although to a somewhat lesser extent using the latter.

Indeed, we have found that when a membrane is made from an aromatic polyamide with only one of these solvents and the structure-loosening additive is then introduced, the membranes are unsatisfactory because although the membrane has a high blowing point, it is practically nonpermeable or, conversely, may have high permeability with an unacceptable low blowing point (bursting strength).

Thus it is indeed surprising that these results do not obtain when the solution is formed from two out of the three mentioned solvents. The use of the two solvents, at least, permits excellent permeability with a satisfactory blowing point or blast point to be obtained. This is especially true when no one of these solvents is present in an amount in excess of 80% of the solvent mixture.

It has also been found most surprisingly that the pore size of the filter membranes of aromatic polyamide of the invention is no longer determined as is ordinarily the case by the precipitating agent as is generally the case, but rather by the mixing ratio of the various individual solutions formed by the respective solvents in the mixture while the structure-loosening additive only has a secondary effect on the pore size.

Finally, it has been noted that for reproducible formation of filter membranes with the desired pore size, it is only necessary to operate with sufficiently high moisture content and to maintain this moisture content or relative humidity for the successively formed membranes in the range of 50 to 90% relative humidity.

The preferred solvent moisture consists of dimethylacetamide and dimethylformamide with a ratio of the dimethylacetamide solution to the dimethylformamide solution between 1:4 and 4:1. Of course, the N-methylpyrrolidone can also be introduced into the solution although it is preferable that the first two components make up at least half of any ternary solvent system which may be used.

When the solvent system consists of dimethylacetamide and N-methylpyrrolidone, the former should make up at least 50% of the solvent mixture and when the solvent system consists of a combination of dimethylformamide and N-methylpyrrolidone, again the former should make up more than 50% of the solvent system.

In the practice of the process of the invention, respective solutions of the aromatic polyamide in each of the solvents to form the system can be combined and at least one of these solvents can be employed as a vehicle for adding the aromatic polyamide to the system. The components are then mixed in the appropriate ratio to achieve the desired proportions of the two or three solvents.

It is also possible in carrying out the process of the invention and in many cases is advantageous with respect to the solution of the particular pore size, to first form the solvent mixture by combining the two or more solvent components in the appropriate porportions and then to dissolve the aromatic polyamide in this solvent mixture.

We have already pointed out that the preferred aromatic polyamide is a copolymer of m-phenylenediamine and isophthalic acid. This copolymer can be dissolved under specified conditions, e.g. by the addition of alkali metal chloride or an alkaline-earth metal chloride to the system consisting of the aromatic polyamide and one or more of the three solvents, namely, the N-methylpyrrolidone, dimethylacetamide and dimethylformamide.

The preferred additive is lithium chloride.

To dissolve the aromatic polyamide, a high mixing velocity is required and considerable mixing energy must be expended to break up the crystal structure. Even under such high energy mixing conditions, the time which is required to dissolve the aromatic polyamide is considerable since solubilization can be seen to begin only after intensive mixing, for say three hours.

The solution formed by dissolving the aromatic polyamide in the solvent system or one of the solvents thereof followed by formation of the solvent system and after addition of the structure-loosening additive can then have its viscosity adjusted by the addition of a further quantity of solvent. The final solution is then cast on a flat, planar or other smooth surface, preferably a plate or a polished metal surface to form a layer of the desired thickness for the particular membrane. The atmosphere in the region of the surface upon which the layer is cast is maintained at a relative humidity of 50 to 90%. Apparently this relative humidity causes the aromatic polyamide to precipitate from the solvent and gel as a film which can be withdrawn while still moist with the solvent from the substrate and washed in a succession of water baths free from the sovlent. The thickness of the finished dried product should be between 0.05 mm and 0.15 mm.

The structure-loosening additive can be a polyhydric alcohol, for example, ethyleneglycol or polyethyleneglycol 400 and water which are effective even in very small proportions. The quantity of water can be combined with one or more of the polyhydric alcohols and added to the mixture or, to one or more of the solvents to be used in the mixture or preferably to the solvent or solvent system which is used to dissolve the polyamide solution to prevent irreversible precipitation.

As noted, the fineness of the membrane is greatly dependent on the prevalent relative humidity which at room temperature should always be kept between 50% and 90%.

The proportion of aromatic polyamide in the mixture to be cast can be between 6 and 12% by weight, the alkali chloride or alkaline-earth chloride (preferably lithium chloride and/or calcium chloride) should be substantially two to six parts by weight and the structure-loosening additive can be present in an amount between 10 and 25 parts by weight while the water is present in an amount between one and four parts by weight with the solvent system making up 65 to 75 parts by weight for 100 parts by weight of the mixture.

It is important to recall that the formation of a solvent mixture is vital to the present invention. For example, when an aromatic polyamide dissolved in dimethylformamide only is used to form a membrane with the addition of a structure-loosening additive, the membrane is entirely unsatisfactory with respect to its permeability although it does have a high blowing point. When under otherwise identical conditions dimethylactamide is used as the solvent, the membrane which results is again completely unsatisfactory, this time because it also has a low blowing point. When N-methylpolypyrrolidone is substituted as the solvent, both low permeability and low blowing point characterize the membrane which results.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
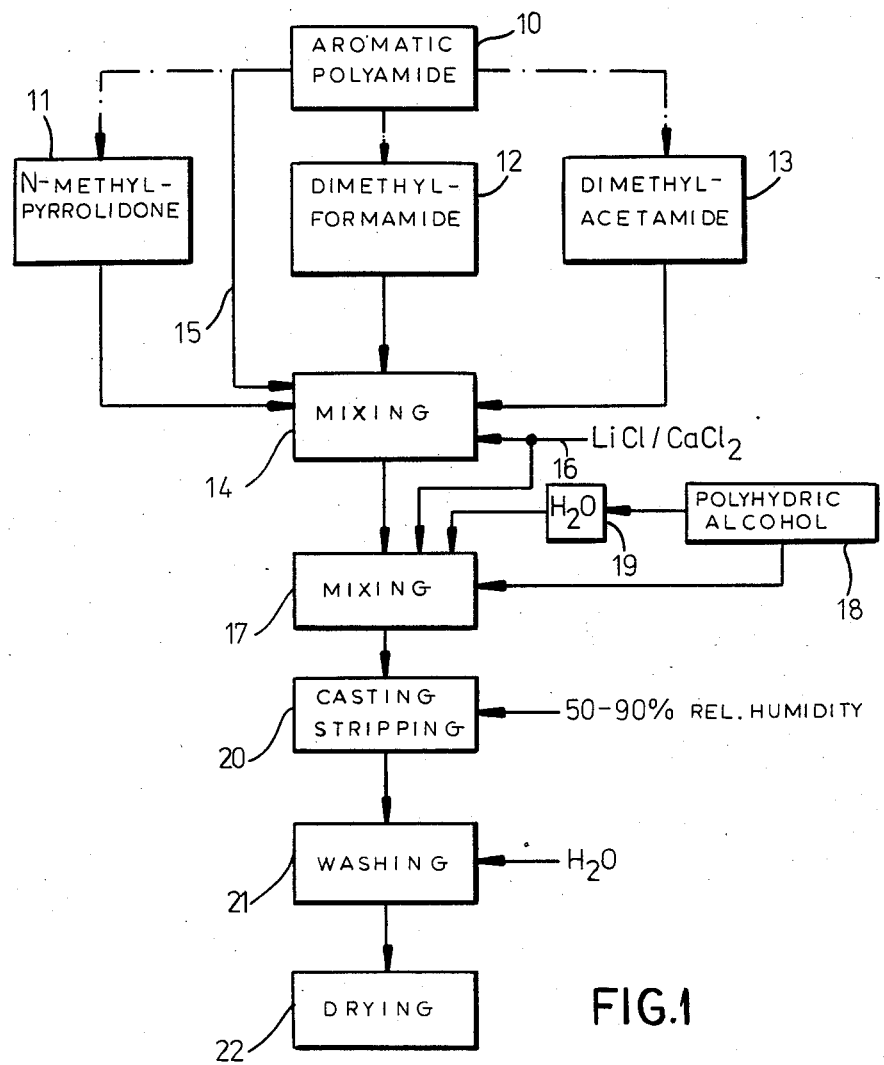
FIG. 1 is a flow diagram illustrating the method of the present invention.

In FIG. 1 of the drawing, a flow diagram illustrative of the invention has been provided. The aromatic polyamide at 10 can be added either to the N-methylpyrrolidone at 11, to the dimethylformamide at 12 or to the dimethylacetamide at 13 or to any combination of whichever two or more of these solvents is to form the solvent system. The solvent system is formed at 14, and as represented by the line 15, the aromatic polyamide can be added here as well. The lithium chloride or calcium chloride can be added, as represented by line 16 at this stage or in the subsequent mixing stage 17 at which the structure-loosening additive is supplied. The structure-loosening additive, the polyhydric alcohol 18 can be added directly or in combination with water as shown at 19. After intensive agitation in both the mixing stages for a period of the order of hours in the best mode embodiment of the invention, the mixture is cast at 20 onto a smooth surface in a relative humidity of 50 to 90%. After stripping from this surface, the membrane is washed a number of times in water as represented at 21 and dried as indicated at 22.

Figure 2:
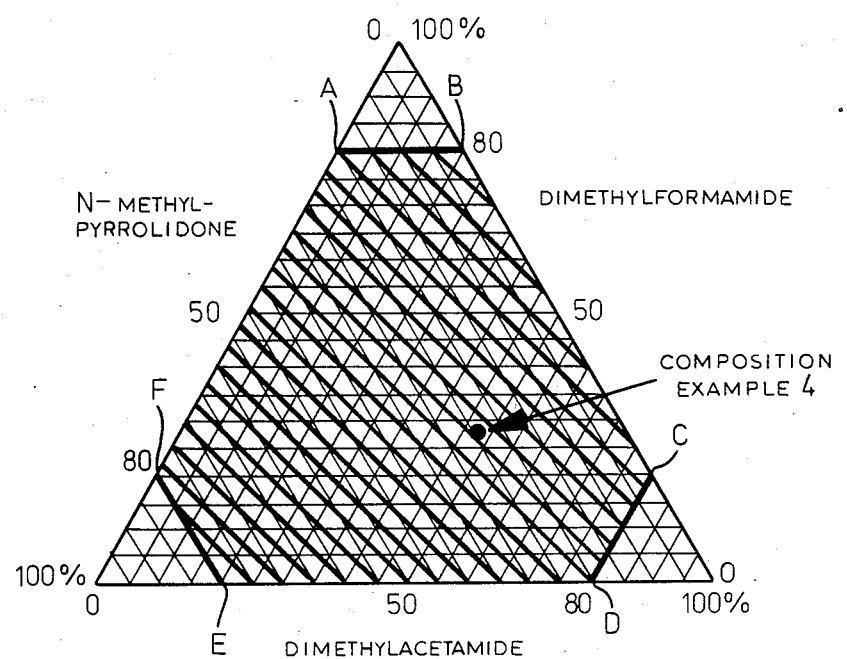
FIG. 2 is a graph showing the preferred composition of a solvent system which can be used for the present invention.

In FIG. 2 we have shown the preferred composition in a ternary diagram of the solvent system, the solvent system of Example 4 having been shown as a point in this diagram. The most preferable compositions lie within the region bounded by the points A, B, C, D, E and F with a particularly preferred composition within the region B, C, D. E.

SPECIFIC EXAMPLES

When not otherwise identified in the following examples, the aromatic polyamide is a copolymer of m-phenylendiamine and isophthalic acid.

EXAMPLE 1

By making a solution of aromatic polyamide and in dimethylformamide and a solution of the same aromatic polyamide in dimethylacetamide, in a ratio such that the ultimate solution ratio of dimethylformamide to dimethylacetamide of 1:4 to 4:1 is obtained, and by feeding additives to the solution, it is possible to obtain high porosity membranes of execptional permeability and high blast point with pore sizes in the range of 0.1 micron to 10 microns. In a best mode example, 401.5 ml to dimethylformamide is used to dissolve with intensive stirring 28 grams of lithium chloride and then 70.5 grams of m-phenylendiamine/isophthalic acid copolymer. A similar mixture is made using dimethylformamide instead of dimethylacetamide.

With intensive stirring the two solvent systems are combined with intensive mixing and 40 grams of water dissolved in 60 grams of dimethylformamide and 30 grams ethylglycol dissolved in 300 grams of dimethylacetamide are added. The intensively stirred product is cast in an atmosphere with a relative humidity of 50 to 90% to a membrane having a mean pore diameter of 0.45 microns, a water permeability of 50 ml/minute/cm$^2$ with a pressure differential of 1.0 bar thereacross. The blast point i.e. pressure at which the membrane burst, was 2.2 bar.

EXAMPLE 2

Similarly excellent microfiltration membranes are made by dissolving the aromatic polyamide in a solvent system consisting of N-methylpyrrolidone and dimethylformamide with these solvents in the volume ratio of 1:4 to 4:1 and with the addition of structure-loosening additives. Such membranes with a satisfactory bursting strength and a pore diameter of 0.1 microns to 3 microns can be made following Example 1 utilizing the following:

Solution 1
40.15 grams dimethylformamide
2.80 grams lithium chloride
7.05 grams m-phenylenediamine/isophthalic acid copolymer Solution 2
40.15 grams N-methylpyrrolidone
2.80 grams lithium chloride
7.05 grams m-phenylenediamine/isophthalic acid copolymer Additives:
4.00 grams water in 6.00 grams dimethylformamide and 30.00 grams dimethylacetamide containing 30.00 grams of ethyleneglycol the membrane had a bursting strength analogous to Example 1, a similar porosity and mean pore diameter of about 2.5 microns.

EXAMPLE 3

The membranes were produced as in Example 1 and had a pore diameter in the range of 0.1 micron to 3.0 microns by mixing solutions 1 and 2 so that the solvent ratio of N-methylpyrrolidone solution to dimethylacetamide solution was 1:4 to 4:1.

Solution 1 equals:
40.15 grams dimethylacetimide
2.80 grams lithium chloride
7.05 grams m-phenylenediamine/isophthalic acid copolymer Solution 2
40.15 grams N-methylpyrrolidone
2.80 grams lithium chloride
7.05 grams m-phenylenediamine/isophthalic acid copolymer Additives:
4.0 grams water in 6.0 grams dimethylacetamide and 30.0 grams ethyleneglycol in 30.0 grams dimethylformamide.

The mean pore size was about 2.5 microns and the permeability and bursting strength were similar to those of Example 1.

EXAMPLE 4

The same method was used with a three-solution system to yield microfiltration membranes with a pore size of 0.1 micron to 3 microns by mixing the solutions in various proportions within the ranges given.

The following solutions were used:
Solution 1
40.1 grams dimethylformamide
2.80 grams lithium chloride
7.05 grams m-phenylenediamine/isophthalic acid copolymer Solution 2
40.15 grams dimethylacetamide
2.80 grams lithium chloride
7.05 grams m-phenylenediamine/isophthalic acid copolymer Solution 3
40.15 grams N-methylpyrrolidone
2.80 grams lithium chloride
7.05 grams m-phenylenediamine/isophthalic acid copolymer The following additives were combined with the mixture made up of the three solutions:

6.0 grams water in 9.0 grams dimethylformamide and 45 grams ethyleneglycol in 45 grams dimethylacetamide.

The mean pore size was about 2 microns and the porocity and bursting strength were similar to those of Example 1.

In all of the examples given, after the membrane was stripped from the casting surface, it was washed many times in water to remove traces of the solvents and then dried.

When calcium chloride was substituted for the lithium chloride in the foregoing examples, similar results were obtained.

We claim:

1. A method of making a microfiltration filter membrane which comprises the steps of:
   (a) forming a solution of a copolymer of isophthalic acid and m-phenylenediamine in a solvent system containing at least two solvents selected from the group which consists of N-methylpyrrolidone, dimethylformamide and dimethylacetamide in which no one of said solvents is in an amount of more than 80% of the solvent system and the solvents of said system are in a proportion selected in accordance with a desired pore size of said membrane;
   (b) forming a mixture which consists essentially of:
   6 to 12 parts by weight of said copolymer in said solution formed in step (a),
   2 to 6 parts by weight of an alkali chloride or alkaline earth chloride,
   1 to 4 parts by weight of water, and
   10 to 25 parts by weight of a polyvalent alcohol or water as a structure-loosening additive;
   (c) casting the mixture of step (b) onto a smooth surface of a chemically inert material and gelling the cast mixture in an atmosphere having a relative humidity of 50 to 90% to form a membrane of a thickness of 0.05 to 0.15 mm, a pore size of 0.05 micron to 10 microns, and microporous on both surfaces of the membrane;
   (d) washing said membrane upon the termination of gelling with a substance in which said copolymer is substantially insoluble to remove solvent therefrom; and
   (e) drying the washed membrane.

2. The method defined in claim 1 wherein two of the solvents in said system are present in a solvent ratio of 1:4 to 4:1.

3. The method defined in claim 1 wherein said polyvalent alcohol is an ethyleneglycol.

4. The method defined in claim 1 wherein said alkali chloride is lithium chloride and said alkaline-earth chloride is calcium chloride.

5. The method defined in claim 1 wherein the solution formed in step (a) is constituted by mixing a solution of said copolymer in dimethylacetamide with a solution of said copolymer in dimethylformamide, the mixing ratio of copolymer/dimethylacetamide to copolymer/dimethylformamide being selected in accordance with the desired pore size of the membrane but within the limits of 1:4 to 4:1.

6. The method defined in claim 1 wherein the solution formed in step (a) is produced by separately dissolving portions of said copolymer in each of the solvents of said system and thereafter mixing the resulting solutions.

7. The method defined in claim 1, further comprising the step of adjusting the viscosity of said mixture in step (b) by adding an additional amount of one of said solvents thereto.

8. The method defined in claim 7 wherein water or a divalent alcohol is previously dissolved in the additional solvent added to adjust the viscosity.

* * * * *